Patented Dec. 8, 1953

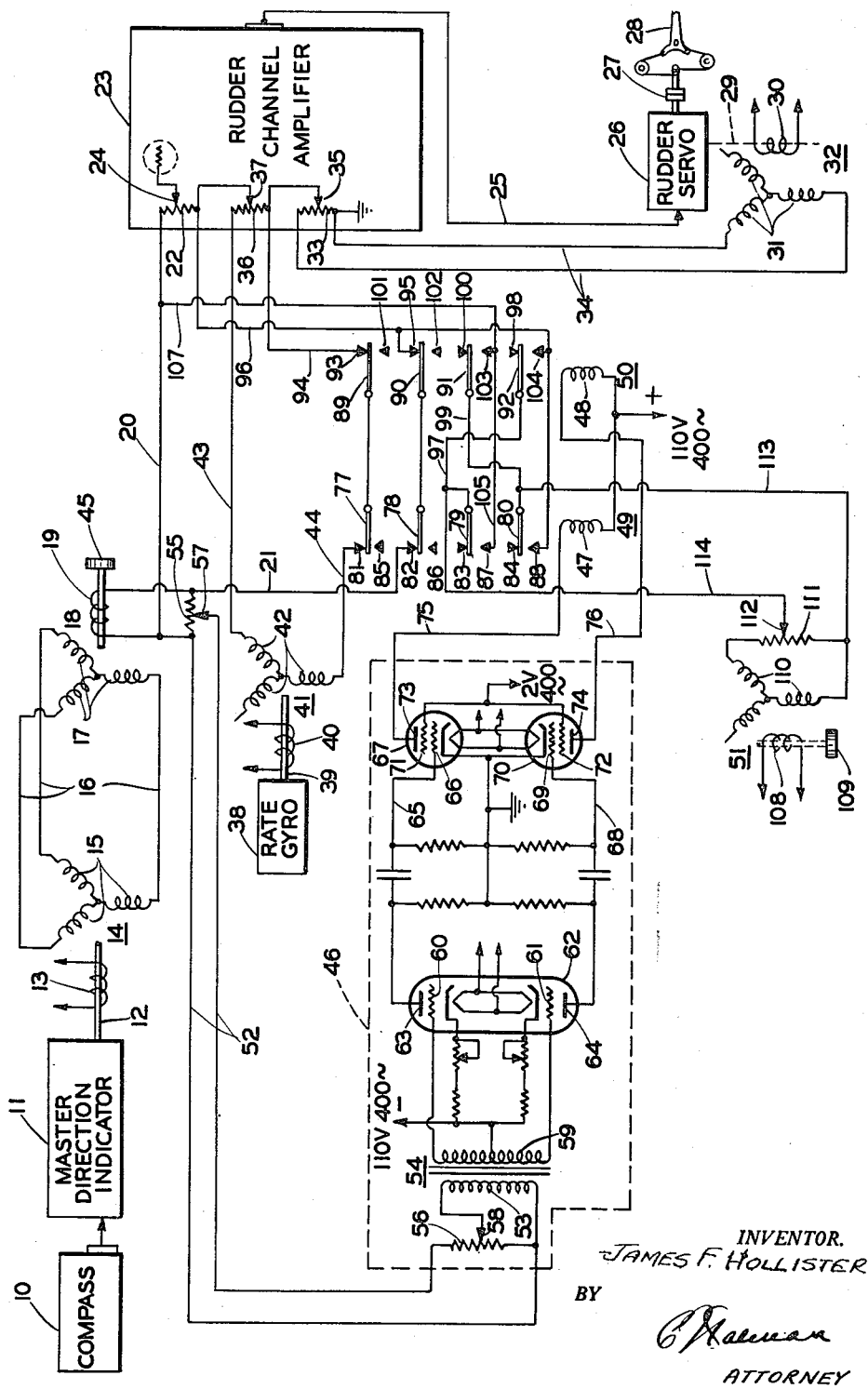

2,662,207

UNITED STATES PATENT OFFICE 2,662,207

AUTOMATIC STEERING SYSTEM WITH DISPLACEMENT LIMITING MEANS

James F. Hollister, Bergenfield, N. J., assignor to Bendix Aviation Corporation, Teterboro, N. J., a corporation of Delaware Application January 7, 1949, Serial No. 69,742

20 Claims. (Cl. 318—489)

1

The present invention relates to automatic steering systems for mobile craft such as air or water craft, for example, and more particularly to a system of the foregoing character in which the range of movement of the surface controlling the craft may be automatically limited to definite and predetermined limits.

Conventional automatic steering systems generally utilize a course displacement signal developed by some form of magnetic or gyro compass for operating a control surface such as a rudder, for example, to return the craft to a desired course which is to be maintained by the craft. Course selector mechanisms are also provided in such systems by the operation of which a displacement signal may be inserted into the system to turn the craft to a desired new course which is to be maintained thereafter.

The present invention contemplates the provision of a novel automatic steering system for mobile craft, such system incorporating rudder limiting means which is automatically operable when the displacement signal exceeds a predetermined value to overpower rudder control by the displacement signal and to assume primary control thereof whereby the effective rudder range is limited to desired limits.

An object of the present invention, therefore, is to provide a novel automatic steering system for mobile craft.

Another object of the invention is to provide a novel automatic steering system for mobile craft in which, in spite of the magnitude of the displacement signal, the effective rudder range may be automatically limited to predetermined limits of movement.

A further object of the invention is to provide a novel automatic pilot or steering system for a mobile craft, provided with a movable rudder surface thereon, embodying an auxiliary adjustable signal generator which is effective in response to a predetermined value of a displacement signal for assuming primary control of the rudder surface to thereby limit the effective rudder range and which, moreover, is made ineffective when the displacement signal drops below the predetermined value so that primary control of the rudder by the displacement signal is reinstated.

Another object is to provide an automatically operable rudder limiting mechanism in an automatic steering system for mobile craft by virtue of which rudder deflection is held to predetermined limits in spite of the magnitude of a displacement signal normally operating the rudder.

2

The above and further objects and novel features of the invention will more fully appear from the following detailed description when the same is read in connection with the accompanying drawing. It is to be expressly understood, however, that the drawing is for the purpose of illustration only and is not intended as a definition of the limits of the invention.

The single figure of the drawing is a diagrammatic illustration of a novel automatic steering system for mobile craft embodying the rudder limiting means hereof.

Referring now to the drawing for a more detailed description of the present invention, the latter is there shown as embodied in a automatic steering system generally comprising a reference or direction maintaining means in the form of a compass, generally designated with the reference character 10, which may be a magnetic, earth inductor or a gyro compass. The compass is connected to a master direction indicator 11 which includes, as better shown in copending application Serial No. 516,488, filed December 31, 1943, now Patent Number 2,625,348 and assigned to the assignee of the present invention, an inductive coupling device having an angularly movable rotor and a two phase driving motor. As a craft, embodying the novel system hereof, is displaced from a given course, a signal is generated by compass 10 which is reproduced in the rotor of the coupling device to thereby energize the motor which will not only displace the rotor to a null position but also by way of a suitable shaft 12 will angularly displace the wound rotor 13 of an inductive signal generator or transmitter device 14 relative to its wound stator 15.

By displacement of rotor 13 relative to its stator 15, the rotor being energized from a suitable source of current, signals are induced in the stator windings which are communicated by way of leads 16 to a wound stator 17 of an inductive device 18 having an angularly displaceable wound rotor 19. The resultant flux vector at stator 17 resulting from the signals in the windings thereof induces a signal in wound rotor 19 which corresponds to the signal at device 14 and, therefore, is the same as the signal developed by the compass.

The displacement signal thus developed by rotor 19 is normally fed, in a manner to presently appear, by way of leads 20 and 21 across a variable resistor 22 located at the input of a conventional rudder channel amplifier 23. An adjustable contact 24 engages with the resistor to communicate the displacement signal to the first amplification stage of the amplifier, such amplifier being more fully shown and described in the aforementioned copending application. Amplifier output is communicated by way of a suitable cable 25 to the variable phase of a two phase induction motor, generally illustrated as rudder servo 26 which, assuming a clutch 27 to be engaged, displaces a rudder surface 28 in accordance with the displacement signal.

Operation of motor 26 to displace rudder 28 also angularly displaces by way of a suitable shaft 29 a wound rotor 30, energized from a suitable source, relative to a wound stator 31 of an inductive follow-up device 32. Displacement of rotor 30 relative to the stator develops a resultant signal in the latter which is applied across a resistor 33 at the amplifier input by way of leads 34. One end of the resistor is grounded as shown, the other end being engaged by an adjustable tap 35 which, in turn, connects with one end of a third resistor 36, the latter being engaged by an adjustable tap 37 connected with one end of resistor 22. The follow-up signal developed by device 32 is in series opposed relation to the displacement signal, whose phase determines the direction of servo operation, and builds up until it is equal and opposite to the displacement signal at which time motor 26 is de-energized. As the craft is caused to return to its course the displacement signal drops toward zero so that the follow-up signal prevails to reverse motor operation to center the rudder as the craft attains the desired course at which time the follow-up signal drops to zero and the servomotor is again de-energized.

In addition to the displacement and follow-up signals, motor 26 is also operated by a signal representing a rate of turn function of the craft displacement. To this end, a rate gyro, generally designated with the reference character 38, displaces by way of a trunnion or shaft 39 the wound rotor 40 of an inductive rate signal device 41 relative to its wound stator 42. The rotor 40, being energized by a suitable source of current, develops on displacement a resultant signal within the stator which is communicated by way of leads 43 and 44, in a manner to presently appear, to the amplifier input across resistor 36. The rate signal impressed across resistor 36 is in series with the displacement and follow-up signals and as the craft departs from its course, the rate signal adds with the displacement signal and opposes the follow-up signal while on craft return to course the rate signal reverses to add with the follow-up signal and opposes the diminishing displacement signal in a well known manner.

In order that the craft course may be changed at will at a point remote from compass 10 and independently thereof a course selector mechanism is provided including inductive device 18, the rotor of which is angularly displaceable relative to its stator by suitable means such as a knob 45. With the foregoing arrangement when it is desired to change craft course, knob 45 is manipulated an angular amount corresponding to the angular amount of course change desired. With the craft on a given course no signal is induced within wound rotor 19 so that the latter bears a null position relative to the resultant flux vector at stator 17 or, stated in another manner, a position of synchronism is maintained by both inductive devices 14 and 18. As soon, however, as knob 45 is manipulated, rotor 19 is displaced from its null position so that synchronism is destroyed and an error or displacement signal is induced therein which, through amplifier 23, operates rudder 28 to turn the craft to the new course. As the craft attains its new and pre-set course the compass causes a signal to be developed within stator 15 of device 14 which, as the pre-set course is achieved, becomes equal and opposite to the displacement signal set in by knob 45 so that the latter signal is eliminated whereupon motor 26 becomes de-energized.

It has been discovered that with the use of the automatic steering system above described on water craft, rudder displacement resulting from a given displacement signal may be greater than feasible for effective operation of the system and for that reason the novel rudder limiting means hereof is provided so that in spite of the magnitude of the displacement signal, rudder range may be effectively limited to definite and desirable limits.

In accordance with the present invention, the novel rudder limiting means hereof comprises a limit amplifier and discriminator unit, generally designated with the reference character 46, the output of which, depending upon the phase of the displacement signal introduced at the input of the unit, will energize one or the other of coils 47 or 48 of a pair of relays 49 and 50. Energization of one or the other of the relays will disconnect the course selector mechanism and its displacement signal as well as the rate signal of device 41 from the input of amplifier 23 and in its stead connect to the amplifier input the output of an inductive auxiliary signal device 51. The manner in which the displacement signal, when it has attained a predetermined value, is automatically overpowered and a pre-set and fixed signal introduced into the system to limit rudder deflection will now be considered.

The displacement signal developed in rotor 19, either because of operation of knob 45 or because of a craft departure from a predetermined course, is normally communicated not only to the amplifier input by ways of leads 20 and 21 but is also communicated by way of leads 52 to the primary 53 of a transformer 54 located at the input of unit 46. Suitable adjustment devices for the signal may be provided in the form of resistors 55, 56 and adjustable taps 57, 58, respectively, as shown. A center tapped secondary 59 of the transformer connects with grids 60 and 61 of an amplifier and discriminator tube 62, current flow being effected at either plate 63 or 64 of the tube depending upon the phase of the incoming displacement signal. Plate 63 of tube 62 connects by way of a lead 65 with the grid 66 of a firing tube 67 while plate 64 of tube 62 connects by way of a lead 68 with the grid 69 of a second firing tube 70. Tubes 67 and 70 are provided with biasing resistors 71 and 72 which are so biased that neither of the tubes will be conductive until the incoming displacement signal, manifested by current flow at either of plate elements 63 or 64 of tube 62, exceeds a predetermined value. As soon as the displacement signal exceeds the prescribed value, and depending upon the phase of such signal, current flow will occur at either plate 73 of tube 67 or plate 74 of tube 70, the former plate connecting by way of a lead 75 with relay coil 47 and the latter connecting by way of a lead 76 with relay coil 48.

Assuming current flow at plate 73 of tube 67 relay coil 47 is energized to thereby operate a bank of movable armatures 77, 78, 79 and 80 out of engagement with fixed contacts 81, 82, 83 and 84, with which the armatures are normally engaged, i. e., when coil 47 is de-energized, into engagement with spaced fixed contacts 85, 86, 87 and 88. Contact 81 is connected with lead 44 of the inductive rate device 41 while fixed contact 82 is connected with lead 21 connected with rotor 19. Fixed contacts 83 and 84 as well as contacts 85 and 86 are open contacts.

Movable armature 77 is electrically connected with a movable armature 89 of a second bank of movable armatures 90, 91 and 92 of relay 50. Armature 89 normally engages with a fixed contact 93 which connects by way of a lead 94 with one end of resistor 36. In this manner the rate signal of device 41 is normally impressed across resistor 36 at the amplifier input.

Movable armature 78, on the other hand, is electrically connected with movable armature 90 which normally engages with a fixed contact 95 connected by way of a lead 96 with one end of displacement signal resistor 22 by virtue of which the displacement signal of rotor 19 is normally impressed across resistor 22 at the amplifier input. Movable armature 79 is electrically connected by way of a lead 97 with movable armature 92 which normally engages with an open contact 98 and movable armature 80 is electrically connected by way of a lead 99 with movable armature 91 which normally engages with an open fixed contact 100.

Upon energization of coil 48, movable armatures 89, 90, 91 and 92 disengage contacts 93, 95, 100 and 98 and are brought into engagement with fixed spaced contacts 101, 102, 103 and 104, contacts 101 and 102 being open contacts while contact 103 connects with contact 87 by way of a lead 105 and contact 104 connects with contact 88 by way of a lead 106. Contact 103 also connects by way of a lead 107 with displacement signal lead 20 while contact 104 connects with lead 96 associated with resistor 22.

Auxiliary signal generator device 51 comprises an angularly displaceable wound rotor 108 which is energized from a suitable source of current and is provided with a settable knob 109. Rotor 108 is inductively coupled with wound stator 110 across which is interposed a resistor 111 engageable by an adjustable tap 112. One end of the resistor connects by way of a lead 113 with lead 99 interconnecting armatures 80 and 91 while tap 112 is connected by way of a lead 114 with lead 97 which interconnects armatures 79 and 92.

By manipulating knob 109, rotor 108 may be displaced to any desired amount so that a signal will be available across leads 113 and 114 which will limit, when the auxiliary generator is connected to the amplifier input, rudder deflection in either direction to a predetermined and definite amount.

The operation of the novel automatic steering system hereof will now be apparent to those skilled in the art. During normal operation, i. e., with relays 49 and 50 de-energized and with the displacement signal appearing at rotor 19 having a value below the predetermined value above which one or the other of the relays will be energized, the displacement signal will be applied across resistor 22 at one of its ends by lead 20 and at its other end by way of lead 21, fixed contact 82, movable armatures 78 and 90, fixed contact 95 and lead 96. The displacement signal is also communicated by way of leads 52 to the input of unit 46, the value of the incoming signal, however, being such that neither of tubes 67 or 70 is conductive so that both relays 49 and 50 remain de-energized.

In addition to the displacement and follow-up signals the rate signal is also normally applied at the input of amplifier 23 in series with the two first signals by virtue of lead 43 which connects stator 42 with one end of resistor 36, and lead 44, fixed contact 81, movable armatures 77 and 89, fixed contact 93 and lead 94 which connect stator 42 with the other end of resistor 36. The three signals add algebraically at the amplifier input to control rudder movement as hereinabove described.

As soon as the displacement signal of rotor 19 exceeds the predetermined value and depending upon the phase of such signal either tube 67 or 70 becomes conductive to energize either relay 49 or 50 to disconnect the source selector mechanism and the rate signal generator from amplifier 23 and to connect in their stead the output of auxiliary signal generator 51 to the amplifier input for limiting control of the rudder.

Assuming current flow to occur at plate element 73 of tube 67, relay coil 47 is energized to disengage armatures 77, 78, 79 and 80 from fixed contacts 81, 82, 83 and 84 and to bring them into engagement with fixed contacts 85, 86, 87 and 88. By disengaging armature 77 from contact 81 and armature 78 from contact 82 both the rate and the displacement signals are disconnected from the input of amplifier 23. By bringing armature 79 into engagement with contact 87 and armature 80 with contact 88, the signal of auxiliary generator 51 is impressed across resistor 22 of amplifier 23 by way of leads 96 and 107, the phase of the auxiliary signal generator being the same as the phase of the displacement signal at rotor 19. The auxiliary signal so inserted controls rudder until such time as the displacement signal of rotor 19 drops below the predetermined value at which time tube 67 ceases to conduct and relay 49 is deenergized whereupon the auxiliary signal generator is disconnected from the amplifier input and the course selector mechanism and rate signal generator are re-connected to the amplifier to take over control of the rudder.

Assuming, on the other hand, current flow to occur at plate element 74 of tube 70, relay coil 48 is energized to disengage armatures 89, 90, 91 and 92 from fixed contacts 93, 95, 100 and 98 and to bring them into engagement with fixed contacts 101, 102, 103 and 104. By disengaging armature 89 from contact 93 and armature 90 from contact 95 the rate signal generator and the course selector mechanism are again disconnected from the amplifier input. By bringing armature 91 into engagement with contact 103 and armature 92 into engagement with contact 104, the output of auxiliary generator 51 is again placed across resistor 22 of the amplifier input but in a reversed sense to that when it is connected to the amplifier by energization of relay 49. Once the displacement signal of rotor 19 drops below the predetermined value, tube 70 ceases to conduct and relay 50 is de-energized whereupon the auxiliary signal generator is disconnected from the amplifier and the course selector mechanism and the rate signal generator are again reconnected to the amplifier to take over primary control of the rudder.

It will now be apparent to those skilled in the art that a novel automatic steering system for mobile craft has been provided hereby with the use of which rudder deflection may be limited to a desired range notwithstanding the magnitude of a controlling displacement signal, such control being accomplished by the use of rudder limiting means which is automatically effective to control rudder when the primary displacement signal exceeds a predetermined value and is made ineffective when the displacement signal drops below the prescribed value and normal rudder operation is reinstated.

Although but a single embodiment of the present invention has been illustrated and described in detail, it is to be expressly understood that the invention is not limited thereto. Various changes may be made in the design and arrangement of the parts without departing from the spirit and scope of the invention as the same will now be understood by those skilled in the art.

What is claimed is:

1. An automatic steering system for a mobile craft having a displaceable control surface thereon, said system comprising a servo motor adapted for connection to said surface for the operation thereof, position maintaining means for generating a signal when said craft departs from a predetermined position and normally connected to said motor for energizing the latter, and surface displacement limiting means connected to said position maintaining means and responsive to a predetermined value of said signal for disconnecting said position maintaining means from said motor, said surface displacement limiting means being normally disconnected from said motor but adapted for connection thereto in response to the predetermined value of said signal for assuming primary control of said motor.

2. An automatic steering system for a mobile craft having a movable rudder surface thereon, said system comprising a servo motor adapted for connection to said rudder for the operation thereof, direction maintaining means for generating a signal when said craft departs from a predetermined course and normally connected to said motor for energizing the latter, rudder limiting means connected to said direction maintaining means and adapted for operating said motor independently of said direction maintaining means, said rudder limiting means being normally disconnected from said motor, and means responsive to a predetermined value of said signal for disconnecting said direction maintaining means from said motor and for connecting said rudder limiting means to said motor whereby the latter is under the primary control of said rudder limiting means so long as said signal is at said predetermined value.

3. An automatic steering system for a mobile craft having a movable rudder surface thereon, said system comprising a servo motor adapted for connection to said rudder for the operation thereof, direction maintaining means for generating a signal when said craft departs from a predetermined course and normally connected to said motor for operating the later, means developing a rate of course change signal normally connected to said motor for combining with said first signal for operating said motor, rudder limiting means connected to said direction maintaining means and adapted for operating said motor independently of said direction maintaining means and said rate of course change means, said rudder limiting means being normally disconnected from said motor, and means responsive to a predetermined value of said first signal for disconnecting said direction maintaining means and said rate of course change means from said motor and for connecting said rudder limiting means to said motor whereby said motor is under the primary control of said rudder limiting means so long as said signal is at said predetermined value.

4. An automatic steering system for a mobile craft having a movable rudder surface thereon, said system comprising a servo motor adapted for connection to said rudder for the operation thereof, direction maintaining means for generating a signal when said craft departs from a predetermined course and normally connected to said motor for operating the latter, means developing a rate of course change signal normally connected said said motor for combining with said first signal for operating said motor, means responsive to the operation of said motor for developing a follow-up signal for modifying operation of said motor, rudder limiting means for operating said motor independently of said direction maintaining means and said rate of course change means and normally disconnected from said motor, and means responsive to a predetermined value of said first signal for disconnecting said direction maintaining means and said rate of course change means from said motor and for connecting said rudder limiting means to said motor.

5. An automatic steering system for a mobile craft having a movable control surface thereon, said system comprising a servo motor adapted for connecting to said surface for operation thereof, position maintaining means for generating a signal when said craft departs from a predetermined position and normally connected to said motor for energizing the latter, a second signal generator connected to said position maintaining means and adapted for operating said motor independently of said position maintaining means, said second signal generator being normally disconnected from said motor, and means responsive to a predetermined value of said first signal for disconnecting said position maintaining means from said motor and for connecting said second signal generator to said motor.

6. An automatic steering system for a mobile craft having a movable rudder surface thereon, said system comprising a servo motor adapted for connection to said surface for the operation thereof, direction maintaining means for generating a signal when said craft departs from a predetermined course and normally connected to said motor for energizing the latter, a second signal generator connected to said direction maintaining means and adapted for operating said motor independently of said direction maintaining means, said second signal generator being normally disconnected from said motor, and means comprising relay means responsive to a predetermined value of said first signal for disconnecting said direction maintaining means from said motor and for connecting said second signal generator to said motor.

7. An automatic steering system for a mobile craft having a movable rudder surface thereon, said system comprising a servo motor adapted for connection to said rudder for the operation thereof, direction maintaining means comprising a first signal generator for developing a displacement signal when said craft departs from a predetermined course and normally connected to said motor for operating the latter to move said rudder to return said craft to said course, a second signal generator connected to said first signal generator adapted for manual setting to develop a selected course signal and normally connected to said motor for operating the latter to move said rudder to turn said craft to said selected course, said second signal being effective to operate said motor until said first signal generator develops a signal to eliminate said second signal, and rudder limiting means responsive to a predetermined value of either of said signals for disconnecting said signal generators from said motor and for assuming primary control of said motor.

8. An automatic steering system for a mobile craft having a movable rudder surface thereon, said system comprising a servo motor adapted for connection to said rudder for the operation thereof, direction maintaining means comprising a first signal generator for developing a displacement signal when said craft departs from a predetermined course and normally connected to said motor for operating the latter to move said rudder to return said craft to said course, a second signal generator connected to said first signal generator adapted for manual setting to develop a selected course signal and normally connected to said motor for operating the latter to move said rudder to turn said craft to said selected course, said second signal being effective to operate said motor until said first signal generator develops a signal to eliminate said second signal, a third signal generator adapted for connection to said motor for operating the latter independently of said first two signal generators and normally disconnected from said motor, and means responsive to a predetermined value of either of said first two signals for disconnecting said first two signal generators from said motor and for connecting said third signal generator to operate said motor.

9. An automatic steering system for a mobile craft having a movable rudder surface thereon, said system comprising a servo motor adapted for connection to said rudder for the operation thereof, direction maintaining means comprising a first signal generator for developing a displacement signal when said craft departs from a predetermined course and normally connected to said motor for operating the latter to move said rudder to return said craft to said course, a second signal generator connected to said first signal generator adapted for manual setting to develop a selected course signal and normally connected to said motor for operating the latter to move said rudder to turn said craft to said selected course, said second signal being effective to operate said motor until said first signal generator develops a signal to eliminate said second signal, a third signal generator adapted for connection to said motor for operating the latter independently of said first two signal generators and normally disconnected from said motor, and means responsive to a predetermined value of either of said first two signals and comprising relay means for disconnecting said first two signal generators from said motor and for connecting said third signal generator to operate said motor.

10. An automatic steering system for a mobile craft having a movable rudder surface thereon, said system comprising a servo motor adapted for connection to said rudder for the operation thereof, direction maintaining means comprising a first signal generator for developing a displacement signal when said craft departs from a predetermined course and normally connected to said motor for operating the latter to move said rudder to return said craft to said course, a second signal generator connected to said first signal generator adapted for manual setting to develop a selected course signal and normally connected to said motor for operating the latter to move said rudder to turn said craft to said selected course, said second signal being effective to operate said motor until said first signal generator develops a signal to eliminate said second signal, a third signal generator actuated in response to operation of said motor for modifying the operation of said motor, and rudder limiting means responsive to a predetermined value of either of said first two signals for disconnecting said first two signal generators from said motor and for assuming primary control of said motor.

11. An automatic steering system for a mobile craft having a movable control surface thereon, said system comprising a servo motor adapted for connection to said surface for the operation thereof, means comprising a course selector mechanism normally connected to said motor and settable to develop an energizing signal for said motor to actuate said surface to change the course of said craft, means operable by said motor for developing a second signal for modifying the operation of said motor, and means normally disconnected from said motor but adapted for connection thereto in response to a predetermined value of said first signal for assuming primary control of said motor to limit deflection of said control surface.

12. An automatic steering system for a mobile craft having a movable control surface thereon, said system comprising a servo motor adapted for connection to said surface for the operation thereof, means comprising a position selector mechanism normally connected to said motor and settable to develop an energizing signal for said motor to actuate said surface to change the position of said craft, means for developing a rate of change of position signal normally connected to said motor for combining with said energizing signal for operating said motor, a third signal generator connected to said position selector mechanism being normally disconnected from said motor but adapted for connection thereto for assuming primary control thereof, and means responsive to a predetermined value of said first signal for disconnecting said position selector mechanism and said rate of change of position means from said motor and for connecting said third signal generator to said motor.

13. An automatic steering system for a mobile craft having a movable control surface thereon, said system comprising a servo motor adapted for connection to said surface for the operation thereof, means comprising a position selector mechanism normally connected to said motor and settable to develop an energizing signal for said motor to actuate said surface to change the position of said craft, means for developing a rate of change of position signal normally connected to said motor for combining with said energizing signal for operating said motor, means operable by said motor for developing a third signal for modifying the operation of said motor, a fourth signal generator normally disconnected from said motor but adapted for connection thereto for assuming primary control thereof, and means responsive to a predetermined value of said first signal for disconnecting said position selector mechanism and said rate of change of position means from said motor and for connecting said fourth signal generator to said motor.

14. In an automatic steering system for mobile craft, the combination with a direction maintaining device and a remote adjustable means for changing course, of a pair of interconnected electrical signal generators adapted to produce a reversible signal upon loss of synchronism between the positions of said generators, a reversible servo motor operated from said signal in a direction to turn the craft in a direction to eliminate said signal, the rotor of one generator being positioned by the direction maintaining device and the rotor of the other generator being positionable by said adjustable means whereby course changes may be effected by adjustment of said remote adjustable means at a point remote from said direction maintaining device, and means responsive to a predetermined value of said signal for overpowering said direction maintaining device and said remote adjustable means and for assuming primary control of said servo motor.

15. In an automatic steering system for a mobile craft, the combination with a direction maintaining device and a remote adjustable means for changing course, of a pair of interconnected electrical signal generators adapted to produce a reversible signal upon loss of synchronism between the positions of said generators, a reversible servo motor, means normally connecting said generators to said motor for operating the latter by said signal in a direction to turn the craft in a direction to eliminate said signal, the rotor of one generator being positioned by the direction maintaining device and the rotor of the other generator being positionable by said adjustable means whereby course changes may be effected by adjustment of said remote adjustable means at a point remote from said direction maintaining device, a third signal generator normally disconnected from said motor and adapted for connection thereto for the operation thereof independently of said first signal, and means responsive to a predetermined value of said first signal for disconnecting said first two signal generators from said motor and for connecting said third signal generator to said motor.

16. An automatic steering system for a mobile craft having a displaceable control surface thereon, said system comprising a servo motor adapted for connection to said surface for displacing the latter, an amplifier having an output connected to said motor and an input, position maintaining means for generating a signal when said craft departs from a predetermined position and normally connected with said amplifier input for operating said motor, and means for limiting displacement of said surface connected to said position maintaining means, said displacement limiting means being normally disconnected from said amplifier input but adapted for connection thereto for assuming primary control of said motor, and means responsive to a predetermined value of said signal for disconnecting said position maintaining means from said amplifier input and for connecting said displacement limiting means to said amplifier input.

17. An automatic steering system for a mobile craft having a movable control surface thereon, said system comprising a servomotor adapted for connection to said surface for the operation thereof, means comprising a position selector mechanism normally connected to said motor and settable to develop an energizing signal for said motor to actuate said surface to change the position of said craft, means comprising a source of control voltage normally disconnected from said motor but adapted for connection thereto to thereby confine movement of said control surface to prescribed limits, and control means responsive to said energizing signal and operative when the latter signal exceeds a prescribed value to make the position selector mechanism ineffective on said motor and to connect said source of control voltage to said motor to assume primary control of the latter.

18. An automatic steering system for a mobile craft having a movable rudder surface thereon, comprising a servomotor adapted for connection to said rudder for the operation thereof, means comprising a course selector mechanism normally connected to said motor and settable to develop an energizing signal for said motor to actuate said rudder to change the course of said craft, means comprising a source of control voltage normally disconnected from said motor but adapted for connection thereto to thereby confine movement of said rudder to prescribed limits, and control means responsive to said energizing signal and operative when the latter signal exceeds a prescribed value to make the course selector mechanism ineffective on said motor and to connect said source of control voltage to said motor to assume primary control of the latter.

19. An automatic steering system for a mobile craft having a movable control surface thereon, said system comprising a servomotor adapted for connection to said surface for the operation thereof, means comprising a position selector mechanism normally connected to said motor and settable to develop an energizing signal of variable amplitude for said motor to actuate said surface to change the position of said craft, limiting means comprising a source of control voltage having a prescribed amplitude normally disconnected from said motor but adapted for connection thereto to thereby confine movement of said surface to prescribed limits, and control means responsive to said energizing signal and operative when the latter signal exceeds a prescribed amplitude to make the position selector mechanism ineffective on said motor and to connect said source of control voltage to said motor for operating the latter.

20. An automatic steering system for a mobile craft having a movable rudder surface thereon, said system comprising a servomotor adapted for connection to said rudder for the operation thereof, means comprising an angularly movable course selector normally connected to said motor and settable to develop an energizing signal for said motor to actuate said rudder to change the course of said craft, a manually operable knob for operating said course selector, means comprising a source of control voltage normally disconnected from said motor but adapted for connection thereto to thereby confine movement of said rudder surface to prescribed limits, and control means responsive to said energizing signal and operative when the latter signal exceeds a prescribed value to make the course selector ineffective on said motor and to connect said source of control voltage to said motor for operating the latter.

JAMES F. HOLLISTER.

References Cited in the file of this patent

UNITED STATES PATENTS

| Number | Name | Date |
|---|---|---|
| 1,436,280 | Minorsky | Nov. 21, 1922 |
| 2,238,300 | Zand et al. | Apr. 5, 1941 |
| 2,487,793 | Esval et al. | Nov. 15, 1949 |